P. E. JAY.
Aging Liquors.
No. 201,679.    Patented March 26, 1878.
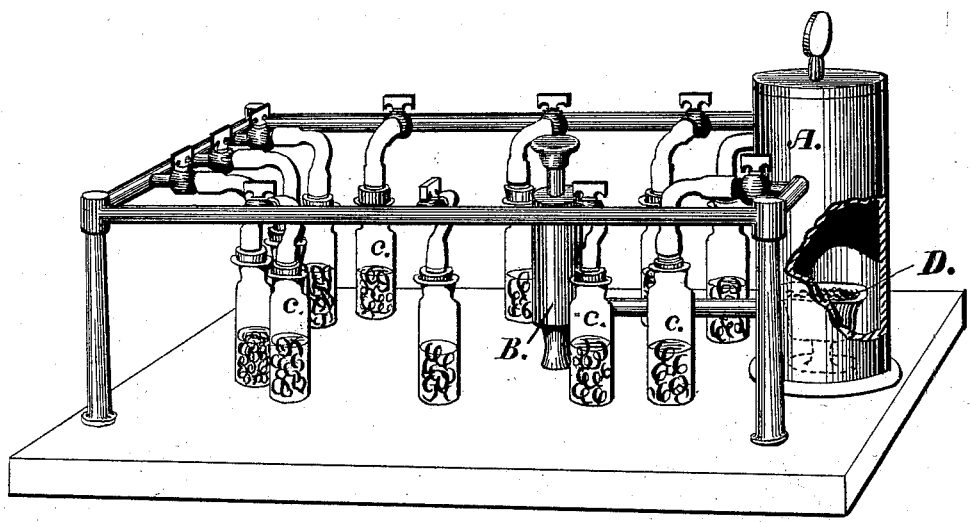
Witnesses:    Inventor:

UNITED STATES PATENT OFFICE.

PIERRE E. JAY, OF BETHLEHEM, PENNSYLVANIA.

IMPROVEMENT IN AGING LIQUORS.

Specification forming part of Letters Patent No. 201,679, dated March 26, 1878; application filed July 27, 1877.

*To all whom it may concern:*

Be it known that I, PIERRE EYMARD JAY, of Bethlehem, in the county of Northampton and State of Pennsylvania, have invented a new and useful Process for Aging Whiskies and other Liquors, and apparatus therefor, which process is fully set forth in the following specification.

My invention relates to a process for aging whiskies and other liquors, and to apparatus therefor.

Referring to the accompanying drawings, A is a receiver, connected on one side with an air-pump, B, and on the other by pipes in which are suitable cocks and branches, with one or more vessels, C C, in which is the liquor to be treated. In the receiver is a vase, D, in which is placed a deliquescent salt. In the vessels C C are placed shavings of oak or other suitable wood and the charge of new whisky to be treated. The vessels are connected, by the perforated stopper, with the main pipe, and the connecting-cocks are closed.

A sufficient vacuum having been produced in the receiver by the air-pump, the cock connecting it with the vessel containing the liquor to be treated is opened, and the air therein is drawn into the receiver, and an ebullition is commenced, which is continued for a considerable time, by reason that the vapors arising from the liquor are condensed by the deliquescent salt, and so the action of the vacuum upon the liquor is continued. Under these circumstances a rapid reciprocal action takes place between the liquor and the shavings in the vessels, resulting in the absorption of the tannic acid of the wood by the liquor, and of the fusel-oil of the liquor, by the shavings, so that the liquor is practically aged as much in hours as ordinarily it has been in years, and with a very small loss by evaporation.

When the vacuum becomes reduced and the ebullition checked, the cock is closed, the vacuum restored by the air-pump, and the action renewed.

The shavings may be renewed, when charged with the oil and exhausted of tannic acid, if the liquor is not sufficiently treated, and the oil so absorbed may be expressed from them and utilized.

When the deliquescent salt becomes too much charged with water to be serviceable, the cocks are closed, and the air-pump is operated until the water is evaporated and the salt again rendered dry and fit for service; or the salt may be dried by heat, either in connection with the air-pump action or alone, as may be most convenient.

The receiver may be surrounded by a refrigerating substance; or such substance may be introduced into a pipe or worm therein; or such pipe or worm may be surrounded with such substance, the same result of condensation being accomplished.

I claim as my invention—

The process of aging liquors, consisting in subjecting them to the action of wood shavings in a vacuum, substantially as and for the purpose described.

P. E. JAY.

Witnesses:
   ABM. STOUT,
   JACOB W. LUCKENBACH.